United States Patent
Liu et al.

(10) Patent No.: US 8,041,115 B2
(45) Date of Patent: Oct. 18, 2011

(54) METHOD AND APPARATUS FOR DETERMINING A CLASSIFICATION BOUNDARY FOR AN OBJECT CLASSIFIER

(75) Inventors: Wei Liu, Shenyang (CN); Huai Yuan, Shenyang (CN)

(73) Assignee: Alpine Electronics, Inc., Tokyo (JP)

( * ) Notice: Subject to any disclaimer, the term of this patent is extended or adjusted under 35 U.S.C. 154(b) by 1007 days.

(21) Appl. No.: 11/940,063

(22) Filed: Nov. 14, 2007

(65) Prior Publication Data

US 2008/0118161 A1 May 22, 2008

(30) Foreign Application Priority Data

Nov. 17, 2006 (CN) .......................... 2006 1 0149452

(51) Int. Cl.
*G06K 9/00* (2006.01)
*G06K 9/62* (2006.01)
*G06K 9/34* (2006.01)
*G06K 9/46* (2006.01)
*G06K 9/66* (2006.01)
*G06K 9/48* (2006.01)

(52) U.S. Cl. ........ 382/173; 382/103; 382/159; 382/180; 382/181; 382/190; 382/199; 382/224

(58) Field of Classification Search .................. 382/103, 382/159, 173, 180, 181, 190, 199, 224
See application file for complete search history.

(56) References Cited

U.S. PATENT DOCUMENTS

| 6,161,071 | A | 12/2000 | Shuman et al. | |
| 6,838,980 | B2 | 1/2005 | Gloger et al. | |
| 2006/0152405 | A1* | 7/2006 | Egri et al. | 342/70 |
| 2006/0165258 | A1* | 7/2006 | Avidan | 382/103 |
| 2006/0193520 | A1* | 8/2006 | Mita et al. | 382/190 |
| 2006/0204103 | A1* | 9/2006 | Mita et al. | 382/190 |

FOREIGN PATENT DOCUMENTS

JP 2006-235953 9/2006

* cited by examiner

*Primary Examiner* — Bhavesh Mehta
*Assistant Examiner* — Bernard Krasnic
(74) *Attorney, Agent, or Firm* — Brinks Hofer Gilson & Lione

(57) ABSTRACT

In a method and apparatus for determining a classification boundary between an object, such as a vehicle, and a background, using an object classifier, a trained classifier is configured to classify and recognize each of a plurality of object images and a plurality of background images. Next, a confidence probability density distribution function is calculated for the vehicle and the background using the determined confidence values for the vehicle images and background images. Once the probability density distribution functions for the vehicle and the background are calculated, the classification boundary between the vehicle and the background is determined using the probability density distribution functions for the vehicle or the background, or both, and a predefined model that is appropriate.

9 Claims, 7 Drawing Sheets

Prior Art

METHOD AND APPARATUS FOR DETERMINING A CLASSIFICATION BOUNDARY FOR AN OBJECT CLASSIFIER

BACKGROUND OF THE INVENTION

1. Related Applications

The present application claims priority to Chinese Patent Application Number 200610149452.1, filed Nov. 17, 2006, the entirety of which is hereby incorporated by reference.

2. Field of the Invention

The invention relates to an object classifier, and more particularly, to a method and apparatus for determining a classification boundary between an object and a background when the object classifier is used to classify and recognize the object.

3. Technical Background

In the pattern recognition of an object image, various classifiers, such as SVM (Support Vector Machines) classifiers, neural network classifiers and so on, are widely employed to classify and recognize objects like vehicles, motorcycles, or pedestrians.

In the prior art, vehicles are often recognized using an SVM classifier when performing pattern recognition of a vehicle in an image. As shown in FIG. 1, classification and recognition of a vehicle using an SVM classifier typically involves two processes: a training process and a recognition process.

During the training process, the SVM classifier is trained by manually selecting images as vehicle training samples (S1) and background training samples (S2), and using the training samples to train the SVM classifier to recognize a vehicle (S3). Once the training process is completed (S4), the recognition process begins.

In the recognition process, first a ROI (Region of Interest) is extracted from the image (S5) using a knowledge-based Method (for example, under-shadow, horizontal edge, vertical edge, symmetry and so on). Next, the extracted ROI is classified and recognized by the trained SVM classifier and a confidence value is obtained for the ROI (S6). Finally, a determination is made (S7) as to whether a vehicle or a background is contained in the image, based on the confidence value for the ROI.

Additionally, when the trained SVM classifier is used to classify and recognize the vehicle and background training samples, a confidence value may be obtained for each of the training samples. The histogram distribution of the confidence values is shown in FIG. 2. Through $x^2$-testing, the confidence values are demonstrated to fit a normal distribution. The confidence values may then be used to obtain confidence probability density distribution curves for the vehicle and background training samples through curve fitting. FIG. 3 illustrates a sample probability density distribution for the vehicle and background training samples. As shown in FIG. 3, the confidence values for the vehicle and the confidence values for the background are completely separated. That is, the confidence values for the vehicle are all greater than zero and the confidence values for the background are all less than zero. In this scenario, because the confidence values for the vehicle and the background are completely separated, a determination may be made as to whether a vehicle or a background is contained in the ROI based on whether the confidence value is greater than zero. When the confidence value is greater than zero, the ROI contains a vehicle. When the confidence value is less than zero, the ROI contains a background.

In order for an SVM classifier to correctly recognize vehicles or backgrounds from an image, it must be calibrated using a sufficient number of training samples to address the potential variations of the vehicle, or the vehicle environment that the SVM classifier may encounter. However, in practical application the sample distribution should be very broad in order for the system to account for the potential variations in the vehicle and the vehicle environment in the recognition process. For example, the vehicles in an image may vary in type and color. The vehicles may also be traveling in different directions or located at various distances and angles with respect to the vehicle on which the classifier is located. Furthermore, the vehicle environment, such as light level, road conditions, weather conditions, and the background may vary dramatically. Because the potential variations are so numerous, a SVM classifier may incorrectly recognize vehicles and backgrounds. In other words, in the prior art it is difficult for a SVM classifier to recognize a vehicle as a background or vice versa because the SVM may not be adequately trained.

When an SVM is not adequately trained as described above, the confidence probability density distribution curves corresponding to the vehicle and the background partially overlap, as shown in FIG. 4.

If the confidence probability density distribution curves overlap and a fixed confidence value is used as the classification boundary in the recognition process (the confidence value is usually zero), some of the requirements necessary to determine whether a vehicle or a background is contained in the image are not met. For example, in some applications the incorrect classification probability of the vehicle and/or the background, and the correct recognition probability of the vehicle and/or the background need to meet a certain target value, e.g. a target value of zero. In these cases, the classifier often fails to meet the determination requirements and is therefore unable to recognize the vehicle or the background correctly. This holds true not only in cases where the SVM classifier is used to classify and recognize vehicles, but also in cases where the SVM classifier is used to classify and recognize objects such as pedestrians.

In fact, if a fixed confidence value is used as the classification boundary and an incorrect recognition occurs during the classification and recognition of an object, it is difficult for any object classifier using the confidence value as the classification basis to make a correct determination as to whether the object or the background is contained in the image.

SUMMARY OF THE INVENTION

In order to reduce errors in the recognition process, it is possible to increase the detecting rate (DR) and decrease the false alarm rate (FAR). This is done by selecting appropriate training samples and parameters, and extracting proper features. However, simply increasing the detecting rate and decreasing the false alarm rate is often insufficient. Consequently, a tradeoff may be made between the detecting rate and the false alarm rate. This tradeoff may be captured by a ROC curve, depending on the number of experiments.

To solve the above described problems, an object of the present invention is to provide a method and apparatus for determining a classification boundary between an object and a background. The classification boundary between the object and the background may be determined so as to meet the various requirements for different applications.

In an embodiment of the present invention for determining a classification boundary between an object and a background, initially a trained classifier is used to classify and recognize each of a plurality of object images and each of a plurality of background images, so as to obtain confidence values for each of the recognized and classified object images and background images.

Next, the confidence values for the object images and the background images are used to calculate a confidence probability density distribution function for the object and the background respectively. Finally, the classification boundary between the object and the background is determined using a predefined model. The predefined model is based on the confidence probability density distribution functions calculated for the object or the background, or both confidence probability density distribution functions.

In order to implement the method described above, the present invention utilizes an apparatus for determining a classification boundary between an object and a background. An embodiment of this apparatus may include a recognizing unit, a calculating unit, and a determining unit.

The recognizing unit is configured use a trained classifier to classify and recognize each of a plurality of object images and background images. The recognizing unit also determines confidence values for each of the plurality of object images and each of the plurality of background images.

The calculating unit is configured to calculate a confidence probability density distribution function for the object in the object images, and a confidence probability density distribution function for the background in the background images. These functions are calculated based on the confidence values determined by the recognizing unit for the object images and background images. The determining unit then determines a classification boundary between the object in the object images and the background in the background images using a predefined model. The predefined model is based on the confidence probability density distribution functions for the object and the background calculated by the calculating unit.

In both the method and apparatus for determining the classification boundary between the object and the background, the predefined model used to determine the classification boundary between the object and the background may be varied as necessary to accommodate different applications.

DETAILED DESCRIPTION OF THE INVENTION

Figure 1:
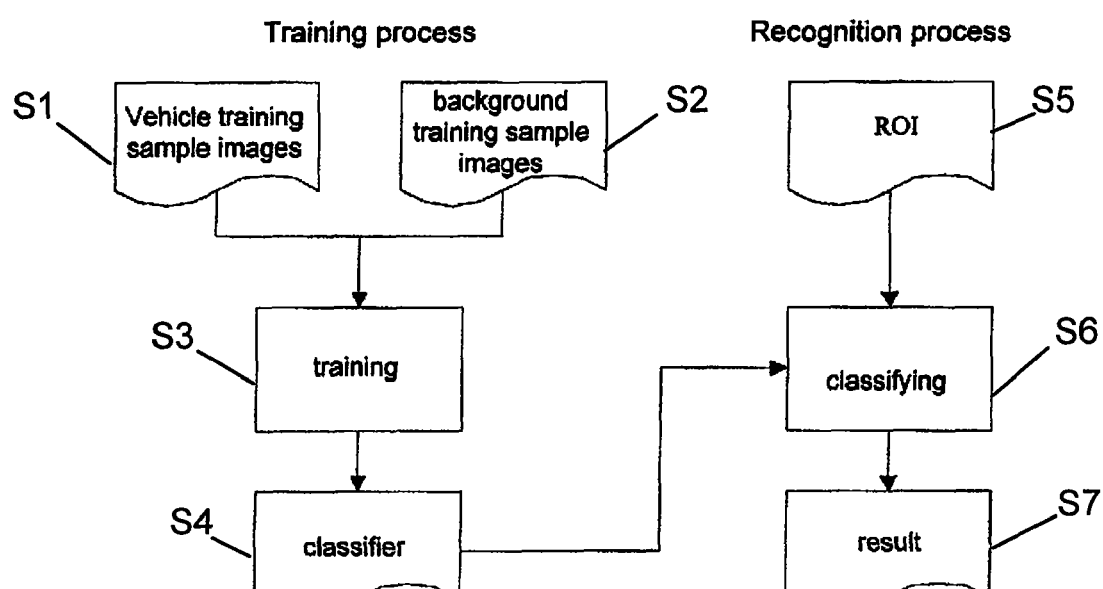
FIG. 1 is a diagram illustrating a prior art method of recognizing a vehicle using a SVM classifier for a pattern recognition of a vehicle in an image.
Figure 2:
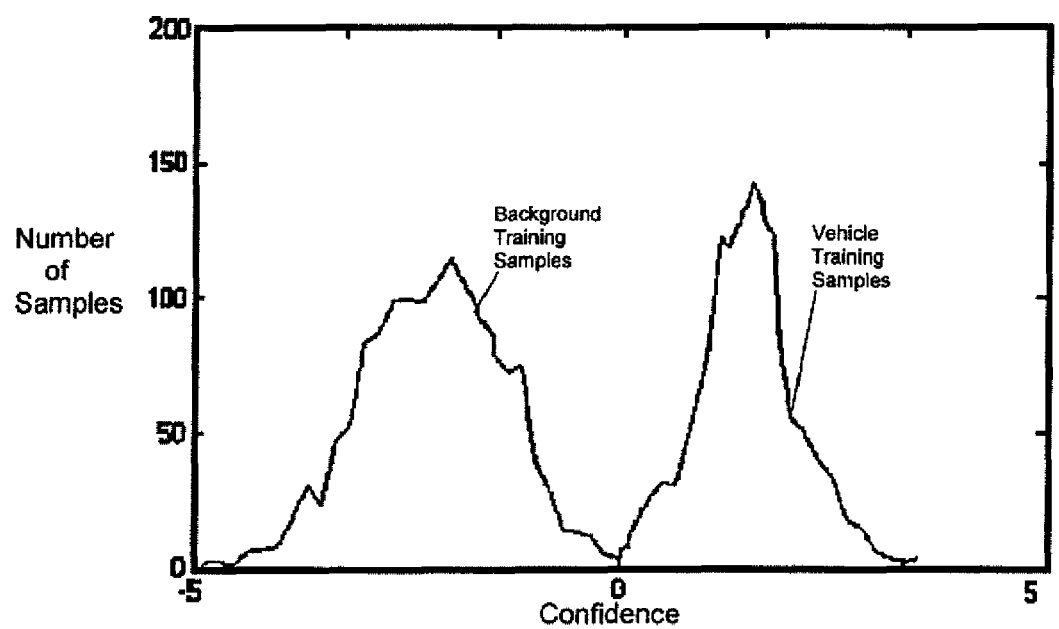
FIG. 2 illustrates a histogram of training sample decision values.
Figure 3:
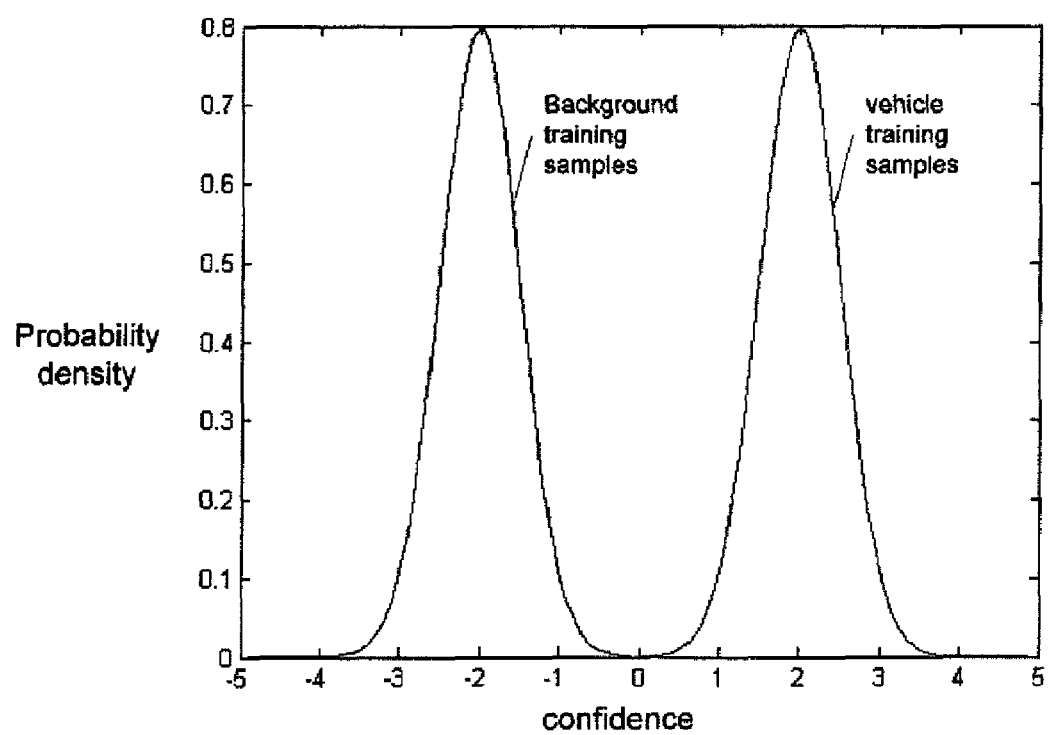
FIG. 3 illustrates confidence probability density distribution curves for a vehicle training sample and a background training sample.
Figure 4:
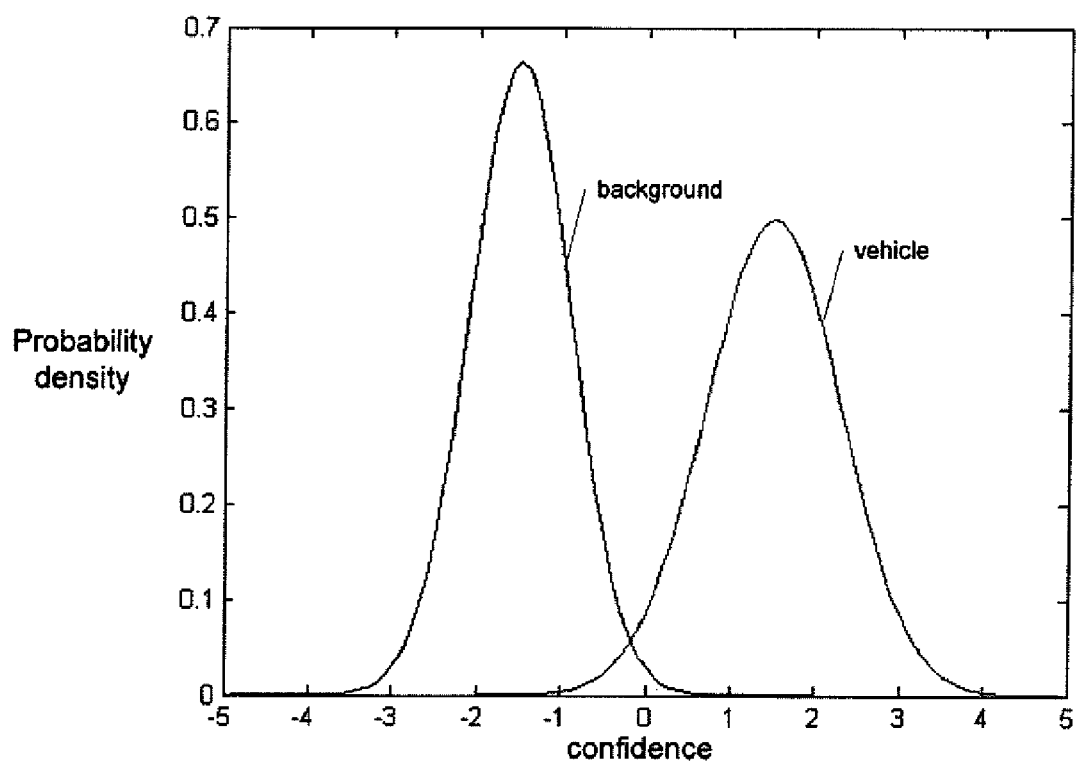
FIG. 4 illustrates practical confidence probability density distribution curves for a vehicle and a background.
Figure 5:
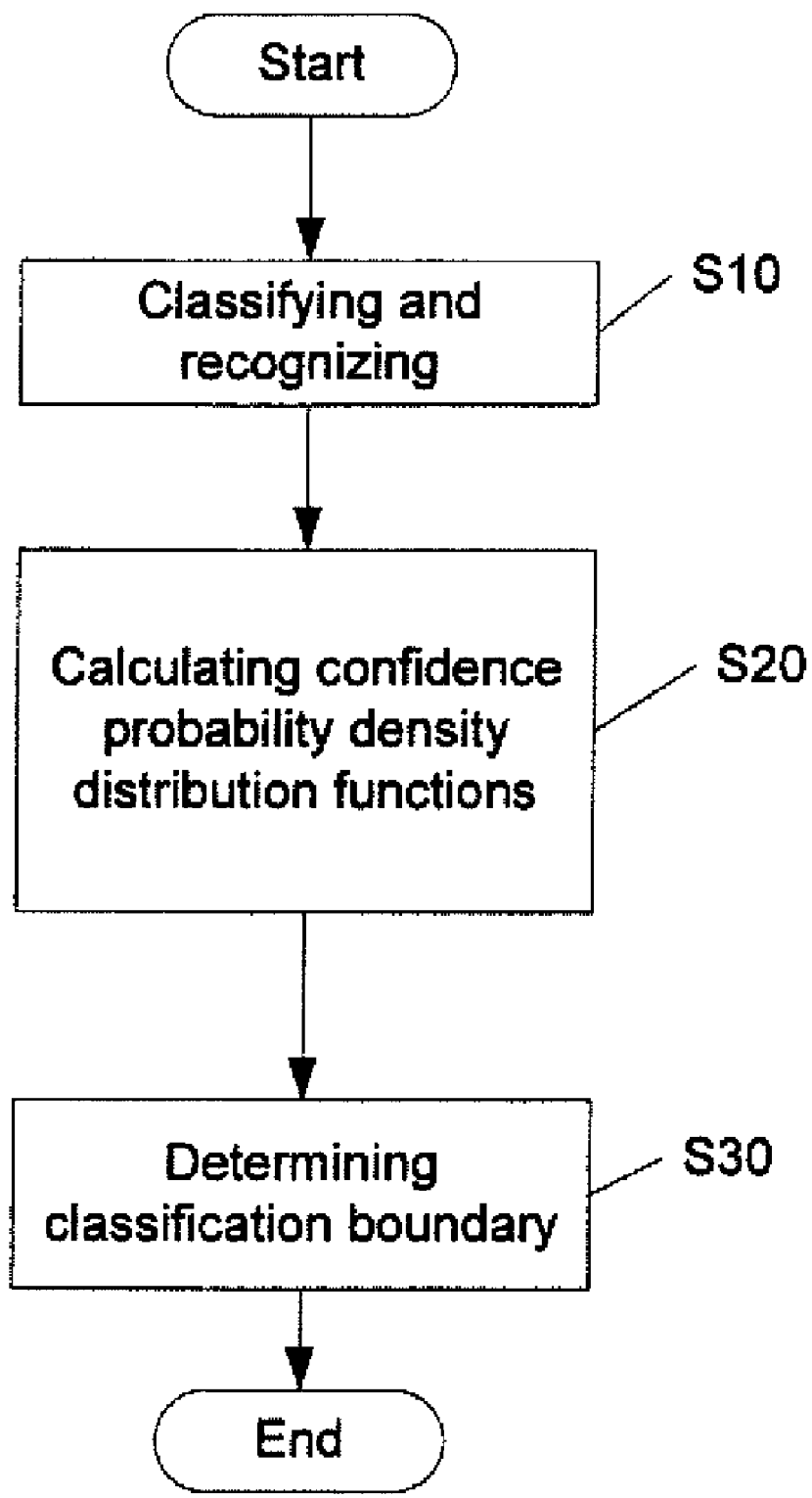
FIG. 5 is a flow chart of a method for determining a classification boundary between a vehicle and a background according to an embodiment of the invention.
Figure 6:
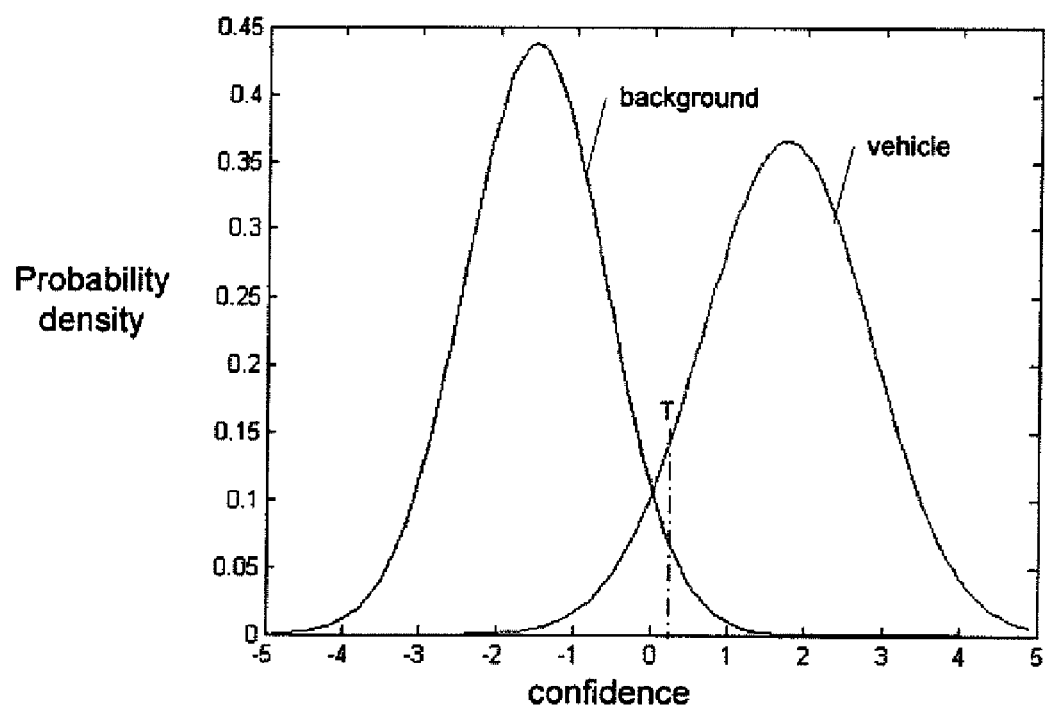
FIG. 6 illustrates confidence probability density distribution curves for a vehicle and a background according to an embodiment of the present invention.

FIGS. 5 and 6 illustrate a method for determining a classification boundary between an object and a background using a SVM classifier which classifies and recognizes an object according to a first embodiment of the present invention.

FIG. 5 is a flow chart showing a method for determining the classification boundary between a vehicle and a background according to an embodiment of the invention. As shown in FIG. 5, initially, a predetermined number of vehicle images and a predetermined number of background images are extracted from images captured by an image pick-up device, such as a digital camera or video camera. In step S10, a trained SVM classifier is configured to classify and recognize each of the predetermined number of vehicle images and background images. The trained SVM classifier then determines a confidence value for each of the predetermined number of vehicle images and background images.

Next, in step S20, a confidence probability density distribution function for the vehicle and the background are calculated based on the confidence values for the predetermined number of vehicle images and the confidence values for the predefined number of background images respectively.

As shown in FIG. 6, in the embodiment, the confidence probability density distribution functions for the vehicle and the background are both normal (Gaussian) distributions. The confidence probability density distribution function for the vehicle $f_v(x)$ and the confidence probability density distribution function for the background $f_b(x)$ are expressed in equations (1) and (2):

$$f_v(x) = \frac{1}{\sigma_v \sqrt{2\pi}} \exp\left[-\frac{(x-\mu_v)^2}{2\sigma_v^2}\right] \quad (1)$$

$$f_b(x) = \frac{1}{\sigma_b \sqrt{2\pi}} \exp\left[-\frac{(x-\mu_b)^2}{2\sigma_b^2}\right] \quad (2)$$

where $\mu_v$ and $\sigma_v$ are the mean and the variance of the confidence values for the predetermined number of vehicle images, respectively, and $\mu_b$ and $\sigma_b$ are the mean and the variance of the confidence values for the predetermined number of background images, respectively.

The following equations (3) to (6) may be used to define the confidence probability density distribution function for the vehicle $f_v(x)$, and the confidence probability density distribution function for the background $f_v(x)$:

$$P_V = \int_T^\infty f_v(x)dx \quad (3)$$

$$P_B = \int_{-\infty}^T f_b(x)dx \quad (4)$$

$$\alpha = \int_T^\infty f_b(x)dx \quad (5)$$

$$\beta = \int_{-\infty}^T f_v(x)dx \quad (6)$$

where T represents the classification boundary between the vehicle and the background, $P_V$ represents the probability of the vehicle being recognized correctly, $P_B$ represents the probability of the background being recognized correctly, $\alpha$ represents the probability of the background being recognized incorrectly as the vehicle (simplified as false alarm in the example), and $\beta$ represents the probability of the vehicle being recognized incorrectly as the background (simplified as missing recognition in the example). The relationship between $P_V$ and $\alpha$, and the relationship between $P_B$ and $\beta$ are expressed below in equations 7 and 8 respectively:

$$P_V + \alpha = 1 \quad (7)$$

$$P_B + \beta = 1 \quad (8)$$

In step S30, once the probability density distribution functions for the vehicle and the background are calculated, the classification boundary between the vehicle and the background is determined using the probability density distribution functions for the vehicle and the background, and a predefined model that is appropriate for the required application.

The classification boundary between the vehicle and the background may be determined using various predefined models, such as the models described below.

1. Error Risk Probability Model

In the minimum incorrect classification probability model, the sum of the probability of recognizing the vehicle as the background and the probability of recognizing the background as the vehicle is minimized. The minimum incorrect classification probability model may also be referred to as a maximum correct recognition probability model, and is expressed by the equation (9):

$$\min(a\alpha+b\beta), \text{that is } \min(a\int_T^\infty f_b(x)dx + b\int_{-\infty}^T f_v(x)dx) \quad (9)$$

where min( ) represents a minimization operation, and a and b represent penalty factors for incorrect classification. The variable a represents a penalty factor for incorrectly recognizing the background as the vehicle (also referred to as false alarm penalty factor in the example), and the variable b represents a penalty factor for incorrectly recognizing the vehicle as the background (also referred to as missing recognition penalty factor in the example). Solving equation (9) yields a classification boundary that minimizes the sum of the two incorrect recognition probabilities.

It should be noted that a and b in equation (9) may be assigned different values in order to adjust the weights for the missing recognition and false alarm penalty factors. For example, in the case where incorrectly recognizing an object, such as a vehicle, as a background (a misrecognition) causes a greater safety risk than incorrectly recognizing a background as a vehicle (a false alarm), b would be assigned a higher value than a. By increasing the value of b, the missing recognition penalty factor is increased, thereby increasing the probability that the classification boundary T will recognize vehicles correctly.

2. DR (FAR) Target Setting Model

In the recognition probability of meeting a target model, either the probability of correctly recognizing the vehicle, or the probability of incorrectly recognizing the vehicle meets a predetermined target value. The recognition probability of meeting a target model is expressed by equations (10) and (11) below:

$$1 - \frac{\beta}{P_V + \beta} > DR \text{ that is, } 1 - \frac{\int_{-\infty}^T f_v(x)dx}{\int_{-\infty}^\infty f_v(x)dx} > DR \quad (10)$$

$$\frac{\alpha}{P_B + \alpha} < FAR \text{ that is, } \frac{\int_T^\infty f_b(x)dx}{\int_{-\infty}^\infty f_b(x)dx} < FAR \quad (11)$$

where DR is the target value for the probability of correctly recognizing the vehicle, FAR is the target value for the probability of incorrectly recognizing the vehicle, and $P_V$, $P_B$, $\alpha$, and $\beta$ are taken from equations 3-6. Solving equations (10) or (11) yields a classification boundary that satisfies the predetermined target value. For example, a classification boundary that satisfies DR>95% or FAR<5%, may be obtained.

3. Multi-Frame Validation Model

In cases where security is a great concern, the vehicle detection system should be very reliable so that objects, such as vehicles, are not misrecognized. Furthermore, it is desirable to detect an object when it is far away from the vehicle the trained classifier is mounted to, so that the vehicle the image pickup device is mounted to will have enough time to respond to the object.

To this end, the classification boundary T should be calculated such that the probability of correctly recognizing a vehicle in multiple frames of images, and the probability of correctly recognizing a vehicle in multiple frames of images meets a predetermined target value. The classification boundary T may also be calculated such that the probability of incorrectly recognizing a vehicle in multiple frames of images meets a predefined target value.

The classification boundary T meeting the predetermined target value for the probability of correctly recognizing a vehicle in the new plurality of images is given by equation (12) below:

$$\sum_{w=1}^n P(1-P)^{w-1} > P' \text{ and } P = \frac{P_V}{P_V + \beta} = \frac{\int_T^\infty f_v(x)dx}{\int_{-\infty}^\infty f_v(x)dx} \quad (12)$$

where P is the probability of correctly recognizing a vehicle in a single frame of an image, n is the number of images that have been detected consecutively, and P' is the target value for the probability of correctly recognizing a vehicle in multiple frames of images.

The classification boundary T meeting the predetermined target value for the probability of incorrectly recognizing a vehicle in multiple frames of images is given by equation (13) below:

$$\sum_{w=1}^n F(1-F)^{w-1} < F' \text{ and } F = \frac{\alpha}{P_B + \alpha} = \frac{\int_T^\infty f_b(x)dx}{\int_{-\infty}^\infty f_b(x)dx} \quad (13)$$

where F is the probability of incorrectly recognizing a vehicle in a single frame of an image, n is the number of images in that have been detected consecutively, and F' is the target value for the probability of incorrectly recognizing the vehicle in multiple frames of images.

While the invention is described above in the context of confidence probability density distribution functions for the vehicle and the background having a normal distribution, it is to be appreciated by those skilled in the art that the invention is not limited thereto. For example, the confidence probability density distribution functions for the vehicle and the background may be functions having non-normal distributions, such as a Poisson distribution or the like.

Furthermore, while the minimum incorrect classification probability is described above as minimizing the sum of the probability of recognizing the vehicle as the background and the probability of recognizing the background as the vehicle, it is to be appreciated by those skilled in the art that the invention is not limited thereto. For example, the minimum incorrect classification probability may comprise the sum of the probability of recognizing the vehicle as the background and the probability of recognizing the background as the vehicle meeting a predetermined target value.

Moreover, in the present invention the object being classified in the images is not limited to a vehicle, and may be a motorcycle, a pedestrian and so on. Additionally, the method for determining a classification boundary between an object and a background of the present invention may be implemented in software, hardware, or a combination of both. The invention may also be implemented as computer executable instructions stored on a computer readable medium for causing a computer processor to perform the steps of the method.

Figure 7:
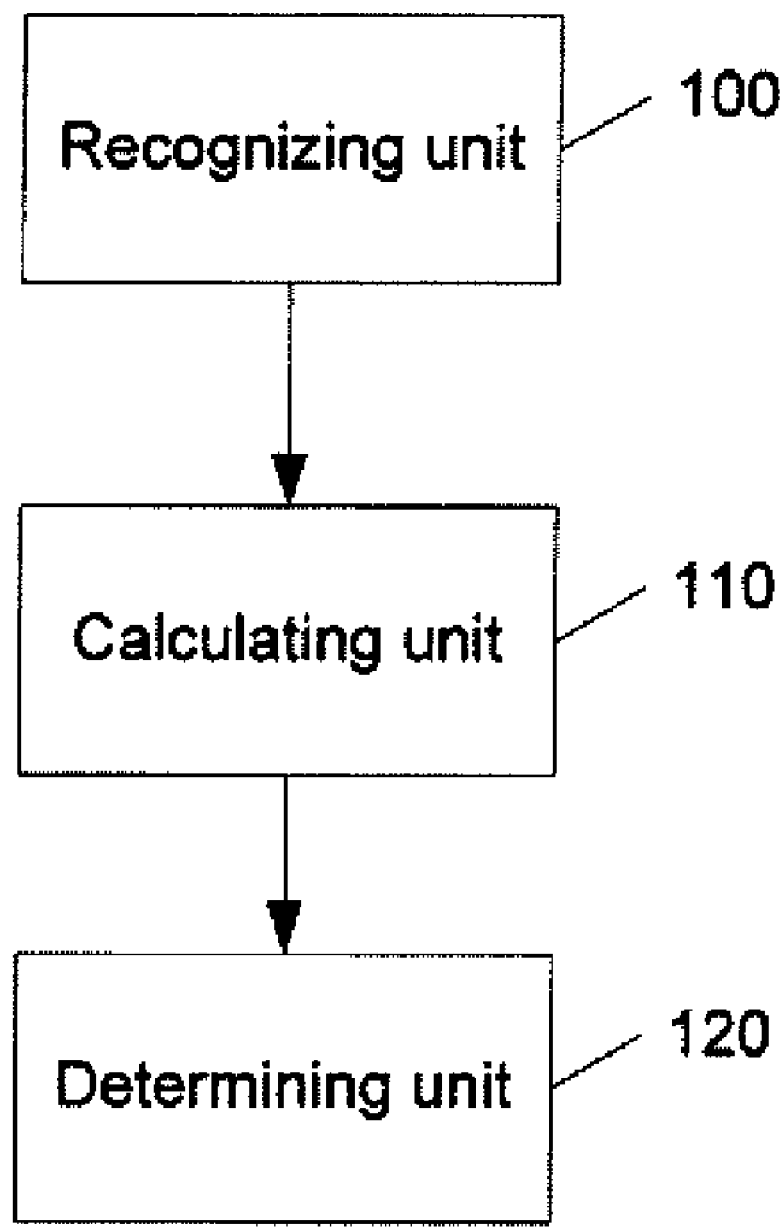
FIG. 7 is a block diagram of an apparatus for determining the classification boundary between a vehicle and a background.

FIG. 7 illustrates an apparatus for determining a classification boundary between an object and a background according to an embodiment of the present invention.

As shown in FIG. 7, the apparatus 10 for determining a classification boundary between an object and a background may include a recognizing unit 100, a calculating unit 110, and a determining unit 120.

The recognizing unit 100 is configured to classify and recognize each of a plurality of object images and a plurality of background images using a trained classifier. The recognizing unit also determines confidence values for each of the plurality of object images and the plurality of background images The calculating unit 110 is configured to calculate a confidence probability density distribution function for the object and the background respectively. These functions are calculated based on the confidence values obtained by the recognizing unit for each of the plurality of object images and background images.

The determining unit 120 is configured to determine the classification boundary between the object and the background using a predefined model. The predefined model is based on the confidence probability density distribution functions for the object and the background calculated by the calculating unit.

The predefined model used to calculate the classification boundary between the object and the background can be based on various probability scenarios. For example, the predefined model may be based on a probability of the object or the background being incorrectly classified, where the probability of the object or the background being incorrectly classified meets a predetermined target value. The predefined model may also be based on a probability that the object will be recognized correctly, and the probability that the object will be recognized correctly meets a predetermined target value. Alternatively, the predefined model may be based on a probability the object will be recognized incorrectly, and the probability the object will be recognized incorrectly meets a predetermined target value. The predefined model may also be based on a probability of correctly recognizing the object in a plurality of images, and the probability of correctly recognizing the object in the plurality of images meets a predetermined target value. Moreover, the model may be based on the probability of incorrectly recognizing the object in a plurality of images, and the probability of incorrectly recognizing the object in the plurality of images meets a predetermined target value.

In the apparatus 10 for determining a classification boundary between an object and a background, the recognizing unit 100 is in electronic communication with the calculating unit 110, and the calculating unit 110 is in electronic communication with the determining unit 120.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A method for determining a classification boundary between an object and a background, comprising:
   recognizing, using a trained classifier, each of a plurality of object images and each of a plurality of background images;
   classifying, using the trained classifier, each of the plurality of object images and each of the plurality of background images;
   determining a confidence value for each of the plurality of recognized and classified object images and for each of the plurality of recognized and classified background images;
   calculating a confidence probability density distribution function for an object in the plurality of object images, wherein the confidence probability density distribution function for the object in the plurality of object images is based on the confidence values determined for the plurality of object images;
   calculating a confidence probability density distribution function for a background in the plurality of background images, wherein the confidence probability density distribution function for the background in the plurality of background images is based on the confidence values determined for the plurality of background images; and
   determining a classification boundary between the object in the plurality of object images and the background in the plurality of background images using a predefined model, wherein the predefined model is based on the calculated confidence probability density distribution functions for the object in the plurality of object images or the background in the plurality of background images, or the calculated confidence probability density distribution functions for both the object in the plurality of object images and the background in the plurality of background images;
   wherein the predefined model comprises a probability of the object in the plurality of object images and the background in the plurality of background images being incorrectly classified, and the probability meets a predetermined target value; and
   wherein the probability of the object in the plurality of object images and the background in the plurality of background images being incorrectly classified that meets the predetermined target value, is calculated by a formula:

$\min(a\int_T^\infty f_b(x)dx + b\int_{-\infty}^T f_v(x)dx)$, wherein min( ) represents a minimization operation, $f_v(x)$ is the confidence probability density distribution function for the object in the plurality of object images, $f_b(x)$ is the confidence probability density distribution function for the background in the plurality of background images, a represents a penalty factor for incorrectly recognizing the background in the plurality of background images, b represents a penalty factor for incorrectly recognizing the object in the plurality of object images, and T represents the classification boundary.

2. The method of claim 1, wherein b is greater than a.

3. The method of claim 1, wherein the confidence probability density distribution functions for the object and the background are normally distributed.

4. A method for determining a classification boundary between an object and a background, comprising:
- recognizing, using a trained classifier, each of a plurality of object images and each of a plurality of background images;
- classifying, using the trained classifier, each of the plurality of object images and each of the plurality of background images;
- determining a confidence value for each of the plurality of recognized and classified object images and for each of the plurality of recognized and classified background images;
- calculating a confidence probability density distribution function for an object in the plurality of object images, wherein the confidence probability density distribution function for the object in the plurality of object images is based on the confidence values determined for the plurality of object images;
- calculating a confidence probability density distribution function for a background in the plurality of background images, wherein the confidence probability density distribution function for the background in the plurality of background images is based on the confidence values determined for the plurality of background images; and
- determining a classification boundary between the object in the plurality of object images and the background in the plurality of background images using a predefined model, wherein the predefined model is based on the calculated confidence probability density distribution functions for the object in the plurality of object images or the background in the plurality of background images, or the calculated confidence probability density distribution functions for both the object in the plurality of object images and the background in the plurality of background images;
- wherein the predefined model comprises a probability of correctly recognizing the object in the plurality of object images, and the probability meets a predetermined target value; and
- wherein the probability of correctly recognizing the object in the plurality of object images that meets the predetermined target value, is calculated by a formula:

$$1 - \frac{\int_{-\infty}^{T} f_v(x)dx}{\int_{-\infty}^{\infty} f_v(x)dx} > DR,$$

wherein $f_v(x)$ is the confidence probability density distribution function for the object in the plurality of object images, T represents the classification boundary, and DR represents the predetermined target value.

5. A method for determining a classification boundary between an object and a background, comprising:
- recognizing, using a trained classifier, each of a plurality of object images and each of a plurality of background images;
- classifying, using the trained classifier, each of the plurality of object images and each of the plurality of background images;
- determining a confidence value for each of the plurality of recognized and classified object images and for each of the plurality of recognized and classified background images;
- calculating a confidence probability density distribution function for an object in the plurality of object images, wherein the confidence probability density distribution function for the object in the plurality of object images is based on the confidence values determined for the plurality of object images;
- calculating a confidence probability density distribution function for a background in the plurality of background images, wherein the confidence probability density distribution function for the background in the plurality of background images is based on the confidence values determined for the plurality of background images; and
- determining a classification boundary between the object in the plurality of object images and the background in the plurality of background images using a predefined model, wherein the predefined model is based on the calculated confidence probability density distribution functions for the object in the plurality of object images or the background in the plurality of background images, or the calculated confidence probability density distribution functions for both the object in the plurality of object images and the background in the plurality of background images;
- wherein the predefined model comprises a probability of incorrectly recognizing the object in the plurality of object images, and the probability meets a predetermined target value; and
- wherein the probability of incorrectly recognizing the object in the plurality of object images that meets the predetermined target value, is calculated by a formula:

$$\frac{\int_{T}^{\infty} f_b(x)dx}{\int_{-\infty}^{\infty} f_b(x)dx} < FAR,$$

wherein $f_b(x)$ is the confidence probability density distribution function for the background in the plurality of background images, T represents the classification boundary, and FAR represents the predetermined target value.

6. A method for determining a classification boundary between an object and a background, comprising:
- recognizing, using a trained classifier, each of a plurality of object images and each of a plurality of background images;
- classifying, using the trained classifier, each of the plurality of object images and each of the plurality of background images;
- determining a confidence value for each of the plurality of recognized and classified object images and for each of the plurality of recognized and classified background images;
- calculating a confidence probability density distribution function for an object in the plurality of object images, wherein the confidence probability density distribution function for the object in the plurality of object images is based on the confidence values determined for the plurality of object images;
- calculating a confidence probability density distribution function for a background in the plurality of background images, wherein the confidence probability density distribution function for the background in the plurality of background images is based on the confidence values determined for the plurality of background images; and
- determining a classification boundary between the object in the plurality of object images and the background in the plurality of background images using a predefined model, wherein the predefined model is based on the calculated confidence probability density distribution functions for the object in the plurality of object images or the background in the plurality of background images, or the calculated confidence probability density distribution functions for both the object in the plurality of object images and the background in the plurality of background images;

wherein the predefined model comprises a probability of correctly recognizing, in a new plurality of images, the object in the plurality of object images, and the probability meets a predetermined target value; and wherein the probability of correctly recognizing, in the new plurality of images, the object in the plurality of object images that meets the predetermined target value, is calculated by a formula:

$$\sum_{w=1}^{n} P(1-P)^{w-1} > P',$$

wherein n represents a number of images in the new plurality of images, P''' represents the predetermined target value, and P is calculated by a formula:

$$P = \frac{\int_T^{\infty} f_v(x)dx}{\int_{-\infty}^{\infty} f_v(x)dx},$$

wherein $f_v(x)$ is the confidence probability density distribution function for the object in the plurality of object images, and T represents the classification boundary.

7. A method for determining a classification boundary between an object and a background, comprising:

recognizing, using a trained classifier, each of a plurality of object images and each of a plurality of background images;

classifying, using the trained classifier, each of the plurality of object images and each of the plurality of background images;

determining a confidence value for each of the plurality of recognized and classified object images and for each of the plurality of recognized and classified background images;

calculating a confidence probability density distribution function for an object in the plurality of object images, wherein the confidence probability density distribution function for the object in the plurality of object images is based on the confidence values determined for the plurality of object images;

calculating a confidence probability density distribution function for a background in the plurality of background images, wherein the confidence probability density distribution function for the background in the plurality of background images is based on the confidence values determined for the plurality of background images; and determining a classification boundary between the object in the plurality of object images and the background in the plurality of background images using a predefined model, wherein the predefined model is based on the calculated confidence probability density distribution functions for the object in the plurality of object images or the background in the plurality of background images, or the calculated confidence probability density distribution functions for both the object in the plurality of object images and the background in the plurality of background images;

wherein the predefined model comprises a probability of incorrectly recognizing, in a new plurality of images, the background in the plurality of background images, and the probability meets a predetermined target value; and wherein the probability of incorrectly recognizing, in the new plurality of images, the background in the plurality of background images that meets the predetermined target value, is calculated by a formula:

$$\sum_{w=1}^{n} F(1-F)^{w-1} < F',$$

wherein n represents a number of images in the new plurality of images, F' represents the predetermined target value, and F is calculated by a formula:

$$F = \frac{\int_T^{\infty} f_b(x)dx}{\int_{-\infty}^{\infty} f_b(x)dx},$$

wherein $f_b(x)$ is the confidence probability density distribution function for the background in the plurality of background images, and T represents the classification boundary.

8. An apparatus for determining a classification boundary between an object and a background, comprising:

a recognizing unit, using a computer processor configured to classify and recognize each of a plurality of object images and background images, using a trained classifier, in order to determine a confidence value for each of the plurality of object images and background images;

a calculating unit, using a computer processor configured to calculate confidence probability density distribution functions for (1) an object in the plurality of object images and (2) a background in the plurality of background images, wherein the calculation of the confidence probability density distribution function for the object in the plurality of object images is based on the confidence values determined for each object image, and the confidence probability density distribution function for the background in the plurality of background images is based on the confidence values determined for each background in the plurality of background images; and a determining unit, using a computer processor configured to determine a classification boundary between the object in the plurality of object images and the background in the plurality of background images using a predefined model, wherein the predefined model is based on the calculated confidence probability density distribution functions for the object in the plurality of object images or the background in the plurality of background images, or the calculated confidence probability density distribution functions for both the object in the plurality of object images and the background in the plurality of background images;

wherein the predefined model comprises one of:

(a) a probability of the object in the plurality of object images and the background in the plurality of background images being incorrectly classified, and the probability meets a predetermined target value, wherein the probability of the object in the plurality of object images and the background in the plurality of background images being incorrectly classified that meets the predetermined target value is calculated by a formula:

$$\min\left(a \int_T^\infty f_b(x)dx + b \int_{-\infty}^T f_v(x)dx\right),$$

wherein min( ) represents a minimization operation, $f_v(x)$ is the confidence probability density distribution function for the object in the plurality of object images, $f_b(x)$ is the confidence probability density distribution function for the background in the plurality of background images, a represents a penalty factor for incorrectly recognizing the background in the plurality of background images, b represents a penalty factor for incorrectly recognizing the object in the plurality of object images, and T represents the classification boundary;

(b) a probability of correctly recognizing the object in the plurality of object images, and the probability meets a predetermined target value, wherein the probability of correctly recognizing the object in the plurality of object images that meets the predetermined target value is calculated by a formula:

$$1 - \frac{\int_{-\infty}^T f_v(x)dx}{\int_{-\infty}^\infty f_v(x)dx} > DR,$$

wherein $f_v(x)$ is the confidence probability density distribution function for the object in the plurality of object images, T represents the classification boundary, and DR represents the predetermined target value;

(c) a probability of incorrectly recognizing the object in the plurality of object images, and the probability meets a predetermined target value, wherein the probability of incorrectly recognizing the object in the plurality of object images that meets the predetermined target value is calculated by a formula:

$$\frac{\int_T^\infty f_b(x)dx}{\int_{-\infty}^\infty f_b(x)dx} < FAR,$$

wherein $f_b(x)$ is the confidence probability density distribution function for the background in the plurality of background images, T represents the classification boundary, and FAR represents the predetermined target value;

(d) a probability of correctly recognizing, in a new plurality of images, the object in the plurality of object images, and the probability meets a predetermined target value, wherein the probability of correctly recognizing, in the new plurality of images, the object in the plurality of object images that meets the predetermined target value is calculated by a formula:

$$\sum_{w=1}^n P(1-P)^{w-1} > P',$$

wherein n represents a number of images in the new plurality of images, P'' represents the predetermined target value, and P is calculated by a formula:

$$P = \frac{\int_T^\infty f_v(x)dx}{\int_{-\infty}^\infty f_v(x)dx},$$

wherein $f_v(x)$ is the confidence probability density distribution function for the object in the plurality of object images, and T represents the classification boundary; and (e) a probability of incorrectly recognizing, in a new plurality of images, the background in the plurality of background images, and the probability meets a predetermined target value, wherein the probability of incorrectly recognizing, in the new plurality of images, the background in the plurality of background images that meets the predetermined target value is calculated by a formula:

$$\sum_{w=1}^n F(1-F)^{w-1} < F',$$

wherein n represents a number of images in the new plurality of images, F' represents the predetermined target value, and F is calculated by a formula:

$$F = \frac{\int_T^\infty f_b(x)dx}{\int_{-\infty}^\infty f_b(x)dx},$$

wherein $f_b(x)$ is the confidence probability density distribution function for the background in the plurality of background images, and T represents the classification boundary.

9. A computer readable non-transitory medium storing computer executable instructions for causing a computer processor to perform the steps of:
recognizing, using a trained classifier, each of a plurality of object images and each of a plurality of background images;
classifying, using the trained classifier, each of the plurality of object images and each of the plurality of background images;
determining a confidence value for each of the plurality of recognized and classified object images and for each of the plurality of recognized and classified background images;
calculating a confidence probability density distribution function for an object in the plurality of object images, wherein the confidence probability density distribution function for the object in the plurality of object images is based on the confidence values determined for the plurality of object images;
calculating a confidence probability density distribution function for a background in the plurality of background images, wherein the confidence probability density distribution function for the background in the plurality of background images is based on the confidence values determined for the plurality of background images; and determining a classification boundary between the object in the plurality of object images and the background in the plurality of background images using a predefined model, wherein the predefined model is based on the calculated confidence probability density distribution functions for the object in the plurality of object images or the background in the plurality of background images, or the calculated confidence probability density distribution functions for both the object in the plurality of object images and the background in the plurality of background images;

wherein the predefined model comprises one of:

(a) a probability of the object in the plurality of object images and the background in the plurality of background images being incorrectly classified, and the probability meets a predetermined target value, wherein the probability of the object in the plurality of object images and the background in the plurality of background images being incorrectly classified that meets the predetermined target value is calculated by a formula:

$$\min\left(a \int_T^\infty f_b(x)dx + b \int_{-\infty}^T f_v(x)dx\right),$$

wherein min( ) represents a minimization operation, $f_v(x)$ is the confidence probability density distribution function for the object in the plurality of object images, $f_b(x)$ is the confidence probability density distribution function for the background in the plurality of background images, a represents a penalty factor for incorrectly recognizing the background in the plurality of background images, b represents a penalty factor for incorrectly recognizing the object in the plurality of object images, and T represents the classification boundary;

(b) a probability of correctly recognizing the object in the plurality of object images, and the probability meets a predetermined target value, wherein the probability of correctly recognizing the object in the plurality of object images that meets the predetermined target value is calculated by a formula:

$$1 - \frac{\int_{-\infty}^T f_v(x)dx}{\int_{-\infty}^\infty f_v(x)dx} > DR,$$

wherein $f_v(x)$ is the confidence probability density distribution function for the object in the plurality of object images, T represents the classification boundary, and DR represents the predetermined target value;

(c) a probability of incorrectly recognizing the object in the plurality of object images, and the probability meets a predetermined target value, wherein the probability of incorrectly recognizing the object in the plurality of object images that meets the predetermined target value is calculated by a formula:

$$\frac{\int_T^\infty f_b(x)dx}{\int_{-\infty}^\infty f_b(x)dx} < FAR,$$

wherein $f_b(x)$ is the confidence probability density distribution function for the background in the plurality of background images, T represents the classification boundary, and FAR represents the predetermined target value;

(d) a probability of correctly recognizing, in a new plurality of images, the object in the plurality of object images, and the probability meets a predetermined target value, wherein the probability of correctly recognizing, in the new plurality of images, the object in the plurality of object images that meets the predetermined target value is calculated by a formula:

$$\sum_{w=1}^n P(1-P)^{w-1} > P',$$

wherein n represents a number of images in the new plurality of images, P" represents the predetermined target value, and P is calculated by a formula:

$$P = \frac{\int_T^\infty f_v(x)dx}{\int_{-\infty}^\infty f_v(x)dx},$$

wherein $f_v(x)$ is the confidence probability density distribution function for the object in the plurality of object images, and T represents the classification boundary; and (e) a probability of incorrectly recognizing, in a new plurality of images, the background in the plurality of background images, and the probability meets a predetermined target value, wherein the probability of incorrectly recognizing, in the new plurality of images, the background in the plurality of background images that meets the predetermined target value is calculated by a formula:

$$\sum_{w=1}^n F(1-F)^{w-1} < F',$$

wherein n represents a number of images in the new plurality of images, F" represents the predetermined target value, and F is calculated by a formula:

$$F = \frac{\int_T^\infty f_b(x)dx}{\int_{-\infty}^\infty f_b(x)dx},$$

wherein $f_b(x)$ is the confidence probability density distribution function for the background in the plurality of background images, and T represents the classification boundary.

* * * * *

UNITED STATES PATENT AND TRADEMARK OFFICE
CERTIFICATE OF CORRECTION

PATENT NO.        : 8,041,115 B2
APPLICATION NO.   : 11/940063
DATED             : October 18, 2011
INVENTOR(S)       : Wei Liu et al.

Page 1 of 1

It is certified that error appears in the above-identified patent and that said Letters Patent is hereby corrected as shown below:

In the Claims

In column 8, claim 1, line 54, in the formula, replace " $\min(a \int_T^\infty f_b(x)dx + b \int_{-\infty}^T f_v(x)dx)$ " with -- $\min(a \int_T^\infty f_b(x)dx + b \int_{-\infty}^T f_v(x)dx)$ --.

In column 11, claim 6, line 25, after "of images," replace "P" represents" with --P' represents--.

In column 14, claim 8, line 10, after "of images," replace "P" represents" with --P' represents--.

In column 16, claim 9, line 27, after "of images," replace "P" represents" with --P' represents--.

In column 16, claim 9, line 53, after "of images," replace "P" represents" with --P' represents--.

Signed and Sealed this
Twenty-ninth Day of November, 2011

David J. Kappos
*Director of the United States Patent and Trademark Office*